United States Patent [19]
Zhang

[11] Patent Number: 5,790,191
[45] Date of Patent: Aug. 4, 1998

[54] METHOD AND APPARATUS FOR PREAMPLIFICATION IN A MOS IMAGING ARRAY

[75] Inventor: Tao Zhang, Fremont, Calif.

[73] Assignee: OmniVision Technologies, Inc., San Jose, Calif.

[21] Appl. No.: 612,233

[22] Filed: Mar. 7, 1996

[51] Int. Cl.[6] ............................................. H04N 3/14
[52] U.S. Cl. ........................ 348/300; 348/302; 348/308
[58] Field of Search ................................ 348/302, 294, 348/304, 305, 308, 300, 248, 249, 250, 320, 321, 322; H04N 3/14

[56] References Cited

U.S. PATENT DOCUMENTS

| | | | |
|---|---|---|---|
| 3,660,663 | 5/1972 | Guildford et al. | 250/83.3 |
| 4,392,158 | 7/1983 | Aoki et al. | 358/213 |
| 4,543,610 | 9/1985 | Ozawa et al. | 358/213 |
| 4,851,917 | 7/1989 | Ohzu | 358/213.22 |
| 5,252,818 | 10/1993 | Gerlach et al. | 250/208.1 |
| 5,345,266 | 9/1994 | Denyer | 348/300 |
| 5,446,493 | 8/1995 | Endo et al. | 348/320 |
| 5,493,423 | 2/1996 | Hosier | 358/482 |
| 5,600,127 | 2/1997 | Kimata | 250/208.1 |

Primary Examiner—Andrew I. Faile
Assistant Examiner—Jacqueline Wilson
Attorney, Agent, or Firm—Christensen, O'Connor, Johnson & Kindness PLLC

[57] ABSTRACT

An improved method of preamplification of signals from a MOS imaging array. Each column of the imaging array includes a charge amplifier. Charge amplifiers for alternating columns are grouped together as an odd group. The remaining charge amplifiers are grouped together as an even group. The signals from the even group and the signals from the odd group are provided to a switch. The switch has two outputs: line A and line B. Lines A and B are routed to two identical second-stage amplifiers. In a first mode, the switch routes the even group to line A and the odd group to line B. In a second mode, the switch routes the even group to line B and the odd group to line A. The switch alternates between the first mode and the second mode during the vertical blanking period of an NTSC scanning scheme.

20 Claims, 4 Drawing Sheets

METHOD AND APPARATUS FOR PREAMPLIFICATION IN A MOS IMAGING ARRAY

FIELD OF THE INVENTION

The present invention relates to metal oxide semiconductor (MOS) imaging arrays, and more particularly, an improved preamplification scheme for MOS imaging arrays.

BACKGROUND OF THE INVENTION

Integrated circuit technology has revolutionized various fields including computers, control systems, telecommunications, and imaging. In the field of imaging, the charge coupled device (CCD) sensor has made possible the manufacture of relatively low cost and small hand-held video cameras. Nevertheless, the solid-state CCD integrated circuits needed for imaging are relatively difficult to manufacture, and therefore are expensive. In addition, because of the differing processes involved in the manufacture of CCD integrated circuits relative to MOS integrated circuits, the signal processing portion of the imaging sensor has typically been located on a separate integrated chip. Thus, a CCD imaging device includes at least two integrated circuits: one for the CCD sensor and one for the signal processing logic.

An alternative low cost technology to CCD integrated circuits is the metal oxide semiconductor (MOS) integrated circuit. Not only are imaging devices using MOS technology less expensive to manufacture relative the CCD imaging devices, for certain applications MOS devices are superior in performance. For example, the pixel elements in a MOS device can be made smaller and therefore provide a higher resolution than CCD image sensors. In addition, the signal processing logic necessary can be integrated alongside the imaging circuitry, thus allowing for a single integrated chip to form a complete stand alone imaging device.

Examples of MOS imaging devices are detailed in "A ¼ Inch Format 250K Pixel Amplified MOS Image Sensor Using CMOS Process" by Kawashima et al., *IEDM* 93-575 (1993), and "A Low Noise Line-Amplified MOS Imaging Devices" by Ozaki et al., *IEEE Transactions on Electron Devices*, Vol. 38, No. 5, May 1991. In addition, U.S. Pat. No. 5,345,266 to Denyer titled "Matrix Array Image Sensor Chip" describes a MOS image sensor. The devices disclosed in these publications provide a general design approach to MOS imaging devices.

The primary building block of an image formed by an MOS imaging device is a pixel. The number, size and spacing of the pixels determine the resolution of the image generated by the imaging device. The pixels of a MOS imaging device are semiconductor devices that transform incident light photons into current signals. The signal produced by each pixel is generally extremely small, in the nanoampere range. This small signal is unsuitable for further processing. Thus, a critical requirement of a MOS image sensor is the ability to preamplify the signal from the individual pixels to a suitable level for further processing.

SUMMARY OF THE INVENTION

The present invention discloses an improved MOS imaging sensor that includes preamplification. The imaging sensor comprises an array of sensing pixels, each pixel outputting a signal that is indicative of the incident light thereon. In addition, a plurality of charge amplifiers for amplifying the signal from the pixels is provided, with one charge amplifier associated with each one column of the sensing pixels. The charge amplifiers are subdivided into an even and an odd group of charge amplifiers of interlaced columns. Two second-stage amplifiers are provided, one for the even group and one for the odd group of charge amplifiers. Finally, a switch that periodically alternates in a swapping manner the association between the second-stage amplifiers and the even and odd groups is provided.

In operation, as the pixels are being scanned row by row, the second-stage amplifiers alternately process each sequential pixel. During a portion of the amplification stage for the first second-stage amplifier, the second second-stage amplifier is in an equalization stage. Similarly, during a portion of the amplification stage for the second second-stage amplifier, the first second-stage amplifier is in an equalization stage. This allows lower speed second-stage amplifiers to be used. Alternatively, this allows a higher signal to noise ratio in the output of the second-stage amplifiers.

Additionally, following completion of the scan of the complete sensing array, during a vertical blanking period, the association between the second-stage amplifiers and the groups of charge amplifiers is rotated. This eliminates the effects of the variations between the DC offset voltage in the second-stage amplifiers.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
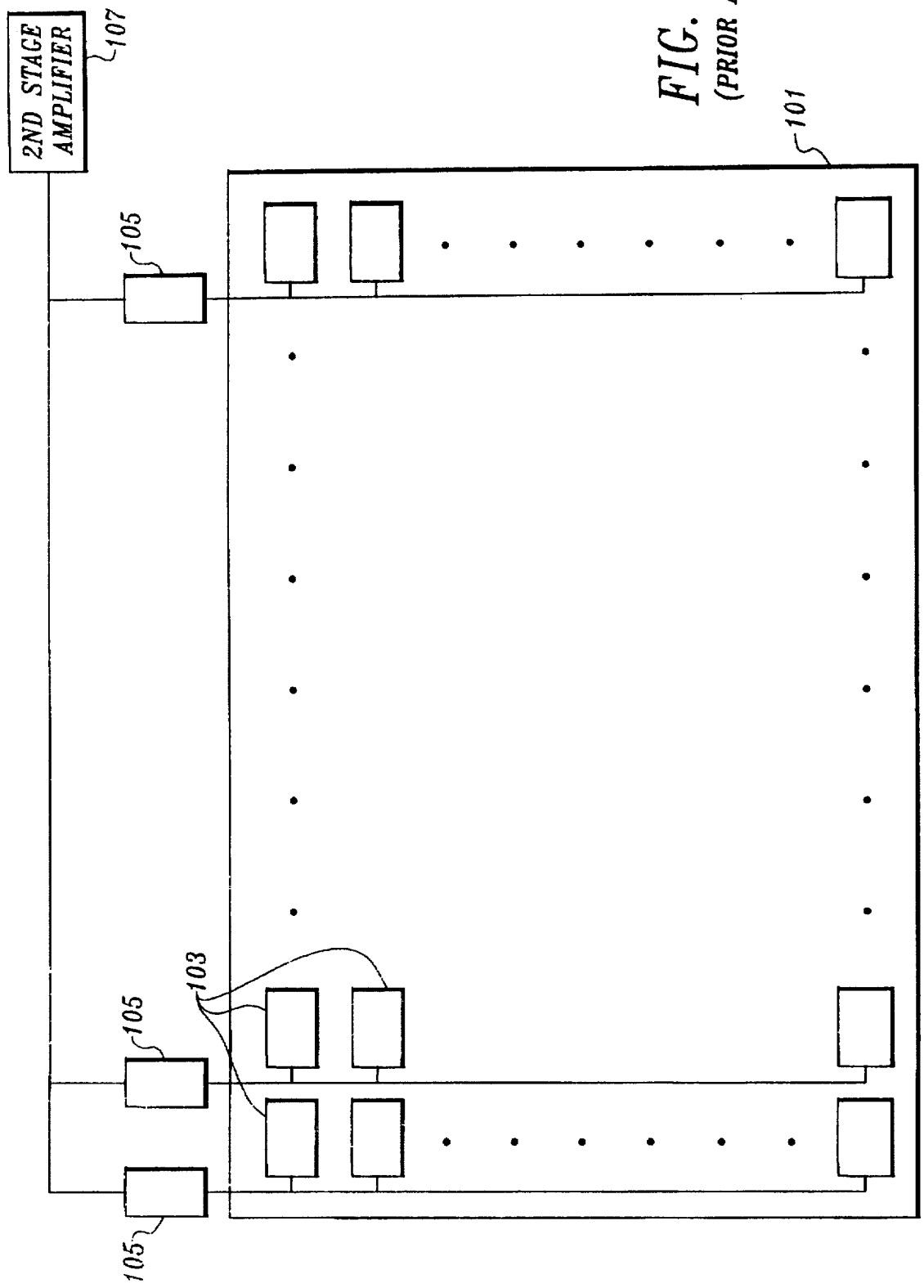
FIG. 1 is a schematic diagram of a prior art CMOS imaging sensor.

With reference to FIG. 1, a prior art architecture for a CMOS imaging array 101 includes a rectangular matrix of pixels 103. The number of pixels in the horizontal or x-direction, and the number of pixels in the vertical or y-direction, constitutes the resolution of the imaging array 101. Each of the pixels 103 in a vertical column routes its signal to a single charge amplifier 105.

The retrieval of information from the pixels 103 follows the well known raster scanning technique. In particular, a row of pixels 103 is scanned sequentially from left to right. The next row is then scanned in this manner until all rows have been scanned sequentially from top to bottom. At the end of each complete scan of the entire array 101, a vertical blanking period of predetermined time occurs until the raster scanning pattern is repeated. This type of scanning follows the NTSC scanning scheme. Control circuitry of conventional design is operative to sequentially read the pixels 103 in this manner.

As each pixel is scanned, the signal from that pixel is provided to the charge amplifier 105 for that column. Thus, the charge amplifiers 105 receive signals sequentially. The sequential signals from the charge amplifiers 105 are then forwarded to a second-stage amplifier 107, which amplifies the signals so that they may be further processed. The prior art architecture of FIG. 1 is further detailed in U.S. Pat. No. 5,345,266 to Denyer titled "Matrix Array Image Sensor Chip".

Figure 2:
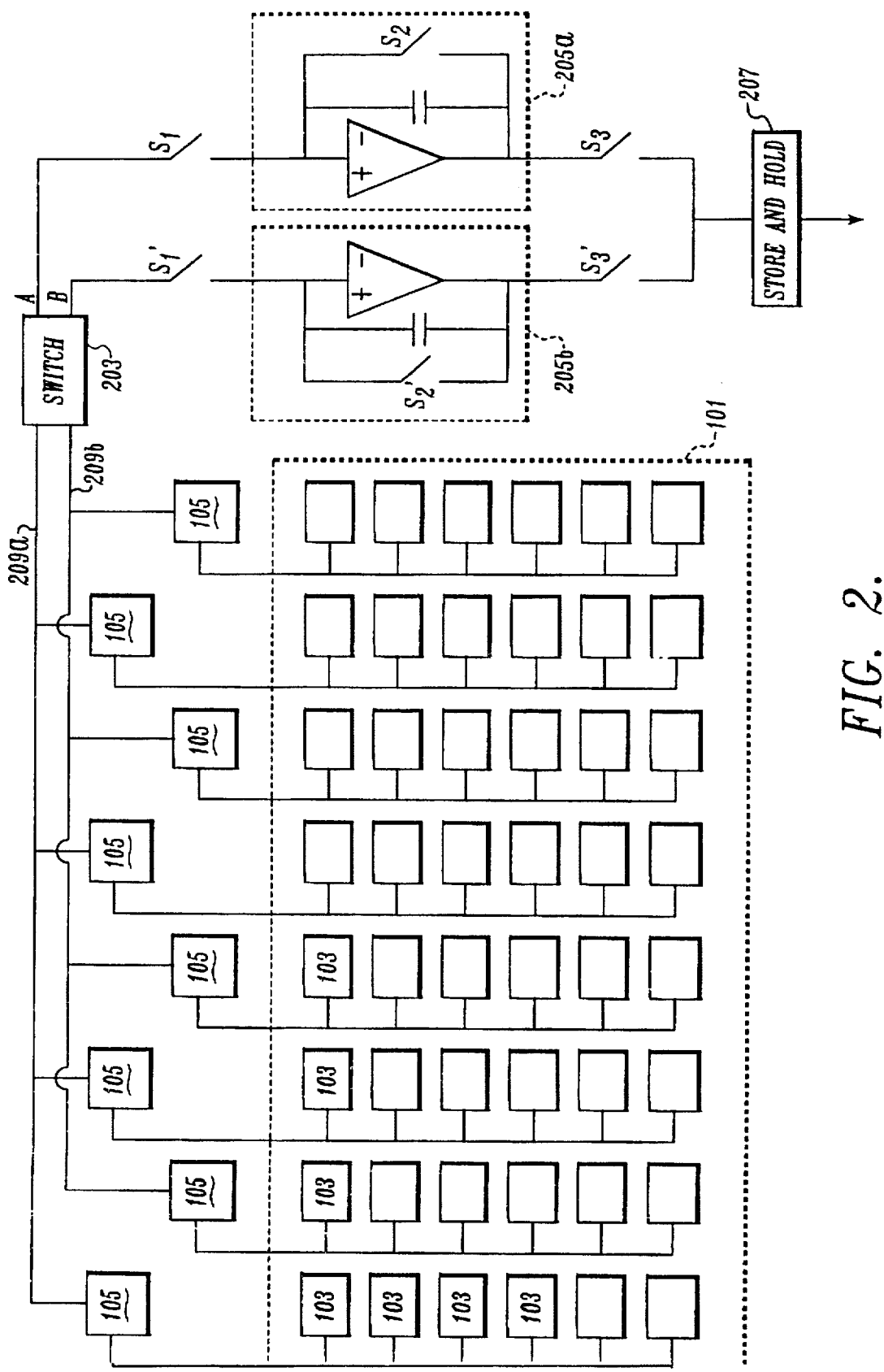
FIG. 2 is a schematic diagram of a CMOS imaging sensor formed in accordance with the present invention.

Turning next to FIG. 2, in the architecture of the preferred embodiment, the array 101 also includes a plurality of pixels 103. In the preferred embodiment, the array is 320 columns by 240 rows. Each of the pixels 103 in a column provide its signal to a charge amplifier 105. The charge amplifier 105 of the preferred embodiment may be formed in accordance with pending U.S. patent application Ser. No. 08/538,441 filed Oct. 3, 1995 entitled Improved Charge Amplifier for MOS Imaging Array and Method for Making Same, assigned to the same assignee as the present application and both expressly incorporated by reference.

Contrary to the prior art, not all of the charge amplifiers 105 are input into a single second-stage amplifier. Rather, alternate columns of pixels 103 are grouped together onto a separate signal bus 209. As seen in FIG. 2, the "odd" columns are routed via signal bus 209a and the "even" columns are routed via signal bus 209b. The signal buses 209a and 209b are input into a switch 203. The switch 203 has two outputs: line A and line B. As will be seen in greater detail below, the switch 203 alternately connects signal bus 209a to line A and B and signal bus 209b to line B and A, respectively.

Line A is provided through switch $S_1$ to a second-stage amplifier 205a. Similarly, line B is provided through switch $S_1'$ to a second-stage amplifier 205b. Second-stage amplifiers 205a and 205b are identical. The output of the second-stage amplifiers 205a and 205b are provided through switches $S_3$ and $S_3'$, respectively, to a store and hold circuit 207 for output to further processing. Store and hold circuit 207 is of conventional design.

As seen, each second-stage amplifier 205a and 205b includes an operational amplifier and a reference voltage source connected between ground and the positive input of the operational amplifier. In addition, a feedback capacitor along with a bypass switch $S_2$ and $S_2'$ is used to provide amplification. Output of the second-stage amplifiers 205a and 205b is provided to store and hold circuit 207 via switches $S_3$ and $S_3'$, respectively.

The novel architecture shown in FIG. 2 remedies a shortcoming in the prior art. Note that the prior art of FIG. 1 only includes a single second stage amplifier 107. This has the disadvantage of requiring an extremely fast amplifier that can quickly amplify the input signal. As an example, the NTSC standards for television require a 60 Hz refresh rate for the entire array. In other words, all of the pixels 103 in the array 101 must be scanned 60 times a second. In the preferred embodiment, where the array 101 is 320 columns by 240 rows, the array 101 has 76,800 pixels. At a rate of 60 Hz, each second, information from 4,608,000 pixels must be read, amplified by charge amplifier 105, and amplified by second-stage amplifier 107. Thus, each pixel 103 must be read and amplified in approximately 217 nanoseconds or 0.217 microseconds.

Because most of the prior art MOS designs for second-stage amplifier 107 use capacitances to perform the amplification, the second-stage amplifier 107 often times cannot perform the full amplification within the allotted time. It can be appreciated by those skilled in the art that capacitances require a finite, often unacceptably lengthy, amount of time to "charge up" to their nominal value. In prior art approaches, the amplification of the signal is abbreviated due to time constraints. This has the disadvantage of lowering the signal to noise ratio of the system. In other prior art system, the increase the speed of amplification, increased current is used to drive the amplifier. This has the disadvantage of increased power consumption.

The present invention solves this problem by providing a plurality of second-stage amplifiers. In the preferred embodiment, the signals from half of the charge amplifiers 105 are grouped together and are provided to a first second-stage amplifier 205a. The other half of the charge amplifiers 105 are grouped together and are provided to a second second-stage amplifier 205b. The first group (referred to as "odd") consists of the first (leftmost) charge amplifier 105 and every other alternate charge amplifier 105. The second group (referred to as "even") are the remaining charge amplifiers 105. As will be seen in greater detail below, the use of two second-stage amplifiers 205a and 205b allows each individual second-stage amplifier additional time to complete the amplification process.

The grouping of the charge amplifiers 105 should be done in an "interlaced" or "interlacing" manner such that adjacent charge amplifiers (in terms of column relationship) are grouped into separate groups. In the preferred embodiment, there are two groups, and thus, every alternating charge amplifier 105 is grouped into one group. In alternative embodiments, three or more groupings may be used. In the case of three groups, every third charge amplifier 105 should be grouped together and provided to three second-stage amplifiers.

Figure 3:
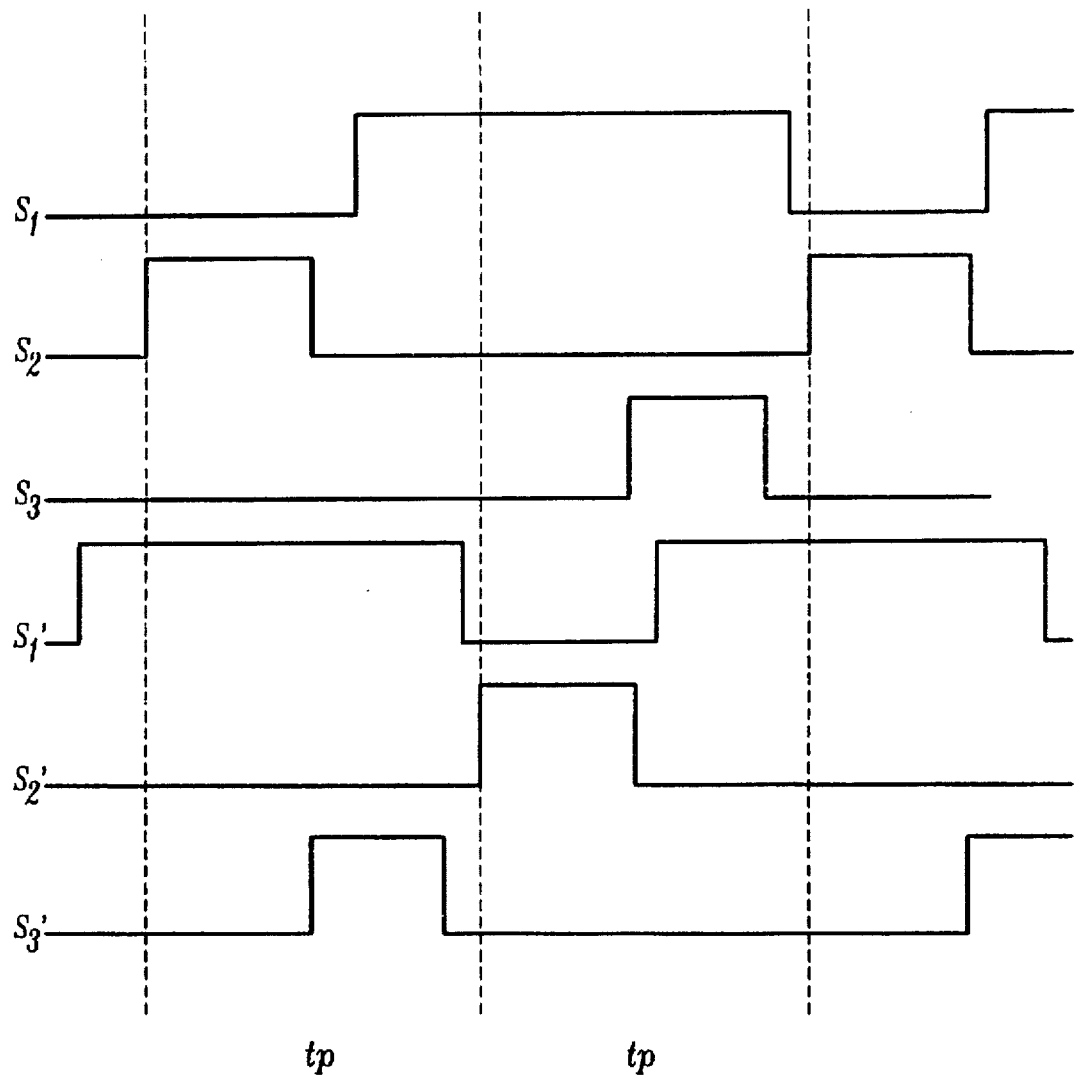
FIG. 3 is a timing diagram illustrating the operation of the preamplification circuit of FIG. 2.

Referring to both FIGS. 2 and 3, the operation of the present invention can be seen. At a first time period $t_p$, switches $S_1$, $S_3$, $S_2'$, and $S_3'$ are all open. Switches $S_2$ and $S_1'$ are closed. Thus, second-stage amplifier 205a is in the equalization mode. The equalization mode indicates that the output of the operational amplifier of second stage amplifier 205a is the same as the voltage at the inverting input of the operational amplifier. In addition, switch $S_1$, is closed indicating that the signal to the second second-stage amplifier 205b is being amplified.

Midway through the first time period $t_p$, switch $S_3'$ closes and allows the amplified signal output from the operational amplifier of second stage amplifier 205b to be provided to store and hold circuit 207. Additionally, halfway through the first time period $T_p$, switch $S_2$ opens. This allows the operational amplifier of second-stage amplifier 205a to behave in an amplifying mode. Shortly after the opening of switch $S_2$, switch $S_1$ closes providing the input signal from line A to be amplified by second-stage amplifier 205a.

Prior to the completion of the first time period $t_p$, switch $S_3'$ opens. Shortly thereafter, but before the completion of the first time period $t_p$, switch $S_1'$ also opens. Next, at the end of the first time period $t_p$ and the beginning of the second time period $t_p$, switch $S_2'$ closes, allowing equalization of the output of the operational amplifier of second-stage amplifier 205b to be equalized with the inverting input of the operational amplifier.

Summarizing the activity during the first time period $t_p$, the input to the second second-stage amplifier 205b is amplified and provided to the store and hold circuit 207. Additionally, after the amplified signal is provided to the store and hold 207, the second second-stage amplifier 205b is equalized during the second time period $t_p$. In addition, during the first time period $t_p$, the first second-stage amplifier 205a is equalized and, during the second half of the first time period $t_p$, the input charge on line A is allowed to begin its amplification.

Continuing on with the description, halfway through second time period $t_p$, switch $S_3$ is closed and switch $S_2'$ is opened. This allows the amplified signal output by the operational amplifier for the first second-stage amplifier 205a to be provided to the store and hold 207. In addition, with regard to the second second-stage amplifier 205b, the equalization process is completed and switch $S_2'$ is opened in preparation for the amplification stage. Shortly thereafter, switch $S_2'$ is closed and the signal is provided to the inverting input of the operational amplifier of the second second-stage amplifier 205b to allow for its amplification.

Moreover, prior to the end of the second time period $t_p$, switch $S_3$ is opened. In addition, after switch $S_3$ is opened, switch $S_1$ is opened just prior to the completion of second time period $t_p$. At the completion of the second time period $t_p$, switch $S_2$ is closed and the first second-stage amplifier 205a enters into the equalization stage.

As can be seen from the foregoing description, and FIGS. 2 and 3, the two second-stage amplifiers alternate amplifying the signals provided by the charge amplifiers 105. When one of the second-stage amplifiers is in the amplification mode, the other second-stage amplifier is in the equalization mode. This scheme allows greater time for each second-stage amplifier to be in the amplification mode. Therefore, the final amplified signal output by the second-stage amplifier has a higher noise-to-signal ratio. The store and hold circuit alternately receives signals from each of the second-stage amplifiers 205a and 205b and provides the output to further signal processing.

Although the use of a plurality of second-stage amplifiers alleviates the speed problem of the prior art, the design of FIG. 2 does introduce an additional performance difficulty. The operational amplifiers used in the second-stage amplifiers 205a and 205b have an input DC offset voltage. The DC offset voltage between the two inputs of an operational amplifier is an unavoidable but, usually, undesirable artifact of the design and manufacture of an operational amplifier.

In some circumstances, the presence of a DC offset voltage would be acceptable i.e., if the DC offset voltages in the operational amplifiers of the second-stage amplifiers 205a and 205b were equal in magnitude and polarity. However, because of variations in the manufacturing process, the DC offset voltage will vary from operational amplifier to operational amplifier. The uncertainty of the DC offset voltage between operational amplifiers interferes with the performance and integrity of the image formed by the MOS imaging sensor. In the case of the operational amplifiers used in the second-stage amplifiers 205a and 205b, variations in the DC offset voltage manifests itself as a systemic variation in the amplified signal. This translates into a systemic variation in the luminosity of the amplified pixels. Because each particular second-stage amplifier amplifies alternating columns of pixels 103, differentials in the DC offset voltage will result in an alternating "bright/dark" pattern between adjacent columns in the final image.

Figure 4:
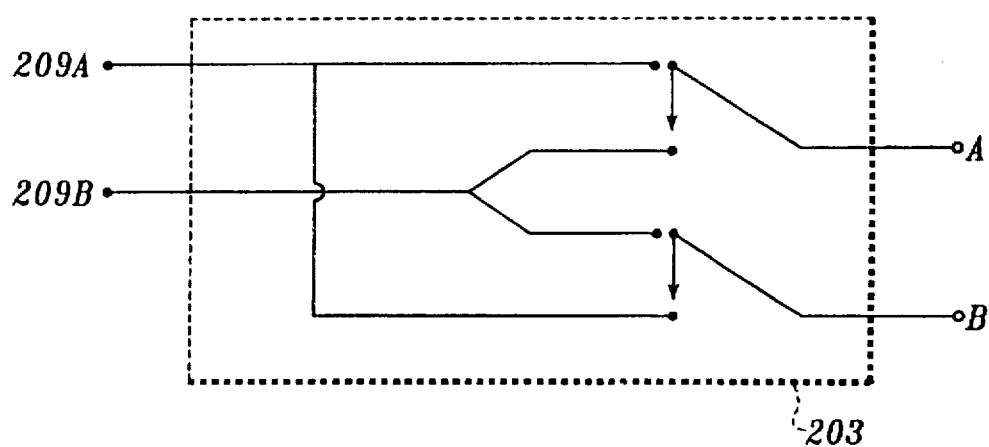
FIG. 4 is a schematic diagram of the switch of FIG. 2.

To solve this problem, switch 203 is incorporated into the architecture of the present invention. Turning next to FIG. 4, switch 203 operates to alternately route the signal buses 209a and 209b to lines A and B. As seen, switch 203 in a first mode routes the signals on signal bus 209a to line A and the signals on signal bus 209b to line B. In a second mode, switch routes the signals on signal bus 209a to line B and the signals on signal bus 209b to line A. In the preferred embodiment, switch 203 alternates between the first mode and the second mode during the vertical blanking period of the NTSC scanning scheme. As is known by those skilled in the art, one vertical blanking period takes place following the completion of each complete scan of the array. Thus, there are sixty vertical blanking periods per second in the NTSC scanning scheme. By alternating the second-stage amplifiers 205a and 205b between the odd and even groups of charge amplifiers 105 at a relatively high rate (such as 60 Hz), the human eye perceives that the "bright/dark" phenomena caused by the variations in DC offset voltage is removed. In reality, the bright/dark pattern still exists in the 1/60 second intervals. However, the effect of switching the phase of the bright/dark pattern is to eliminate the perceived pattern.

While the preferred embodiment of the invention has been illustrated and described, it will be appreciated that various changes can be made therein without departing from the spirit and scope of the invention. For example, in the preferred embodiment, the charge amplifiers are grouped into two groups routed to two second-stage amplifiers. Embodiments where the charge amplifiers are grouped into three or more groups routed to three or more second-stage amplifiers through a sequential switch can work equally well. The only requirement is that the groups of charge amplifiers be relatively evenly spaced apart. Further, in the case of three groups of charge amplifiers, the switch should rotate sequentially the association between the groups of charge amplifiers and the second-stage amplifiers.

The embodiments of the invention in which an exclusive property or privilege is claimed are defined as follows:

1. An imaging array comprising:
   an array of sensing pixels, each pixel outputting a signal;
   a plurality of charge amplifiers for amplifying said signals from said sensing pixels into a first amplified signal, one of said plurality of charge amplifiers associated with one column of said sensing pixels and for amplifying exclusively said signals from said sensing pixels in said associated column, said plurality of charge amplifiers divided into a plurality of groups;
   a plurality of second-stage amplifiers for selectively receiving said first amplified signal and outputting a second amplified signal, one of said second-stage amplifiers associated with one of said plurality of groups and for amplifying said first amplified signal from said associated group into said second amplified signal; and
   a switch for periodically rotating the association between said plurality of groups and said plurality of second-stage amplifiers.

2. The imaging array of claim 1 wherein said plurality of groups consists of a first group of charge amplifiers for said array and a second group of charge amplifiers, said first group of charge amplifiers and said second group of charge amplifiers forming an interlaced pattern.

3. The imaging array of claim 1 wherein said pixels, said charge amplifiers, said second-stage amplifiers, and said switch is formed from metal oxide semiconductor devices.

4. The imaging array of claim 1 wherein said output of said second-stage amplifiers is provided to a store and hold circuit.

5. The imaging array of claim 2 wherein said output of said second-stage amplifiers is provided to a store and hold circuit.

6. The imaging array of claim 3 wherein said output of said second-stage amplifiers is provided to a store and hold circuit.

7. The imaging array of claim 1 wherein the rotation of association by said switch is done following the amplification of said signals of all of said sensing pixels by said charge amplifiers and said second-stage amplifiers.

8. The imaging array of claim 2 wherein the rotation of association by said switch is done following the amplification of said signals of all of said sensing pixels by said charge amplifiers and said second-stage amplifiers.

9. The imaging array of claim 3 wherein the rotation of association by said switch is done following the amplification of said signals of all of said sensing pixels by said charge amplifiers and said second-stage amplifiers.

10. The imaging array of claim 5 wherein the rotation of association by said switch is done following the amplification of said signals of all of said sensing pixels by said charge amplifiers and said second-stage amplifiers.

11. A method of preamplifying signals from a imaging array comprising an array of sensing pixels that output a signal, the method comprising the steps of:

(a) associating a charge amplifier with each column of said sensing pixels, said charge amplifier for amplifying into a first amplified signal exclusively said signals from said sensing pixels in said column;

(b) dividing said charge amplifiers into a plurality of groups;

(c) associating a second-stage amplifier with each group of said charge amplifiers, said second-stage amplifier for amplifying said first amplified signal from said associated group into a second amplified signal;

(d) sequentially outputting said signal from said sensing pixels in a raster scan manner;

(e) amplifying said signal by said charge amplifier and said second-stage amplifier as said signals are output by said raster scan manner; and (f) periodically rotating the association between said plurality of groups and said second-stage amplifiers.

12. The method of claim 11 wherein the step of dividing said charge amplifiers comprises dividing said charge amplifiers into two groups such that said two groups include charge amplifiers from interlaced columns.

13. The method of claim 12 further including the step of periodically rotating the association between said two groups and said second-stage amplifiers.

14. The imaging array of claim 11 further including the step of providing said output of said second-stage amplifiers is provided to a store and hold circuit.

15. The imaging array of claim 12 further including the step of providing said output of said second-stage amplifiers is provided to a store and hold circuit.

16. The imaging array of claim 12 further including the step of providing said output of said second-stage amplifiers is provided to a store and hold circuit.

17. A metal oxide semiconductor imaging array comprising:

a two-dimensional array of sensing pixels, each pixel outputting a signal;

a plurality of charge amplifiers for amplifying said signals output by said pixels into a first amplified signal, one of said plurality of charge amplifiers associated with one column of said sensing pixels and for amplifying exclusively said signals from said sensing pixels in said associated column, said plurality of charge amplifiers divided into an even group and an odd group;

a first second-stage amplifier for receiving and amplifying said first amplified signal from said even group into said second amplified signal; and a second second-stage amplifier for receiving and amplifying said first amplified signal from said odd group into said second amplified signal;

a switch for periodically rotating the association between said second-stage amplifiers and said even group and said odd group.

18. The imaging array of claim 17 wherein said pixels, said charge amplifiers, said second-stage amplifiers, and said switch is formed from metal oxide semiconductor devices.

19. The imaging array of claim 17 wherein said output of said second-stage amplifiers is provided to a store and hold circuit.

20. The imaging array of claim 17 wherein the rotation of association by said switch is done following the amplification of said signals of all of said sensing pixels by said charge amplifiers and said second-stage amplifiers.

* * * * *